June 7, 1960
F. D. COOPER
2,939,763
TREATMENT OF WASTE PICKLE LIQUOR
Filed April 1, 1955
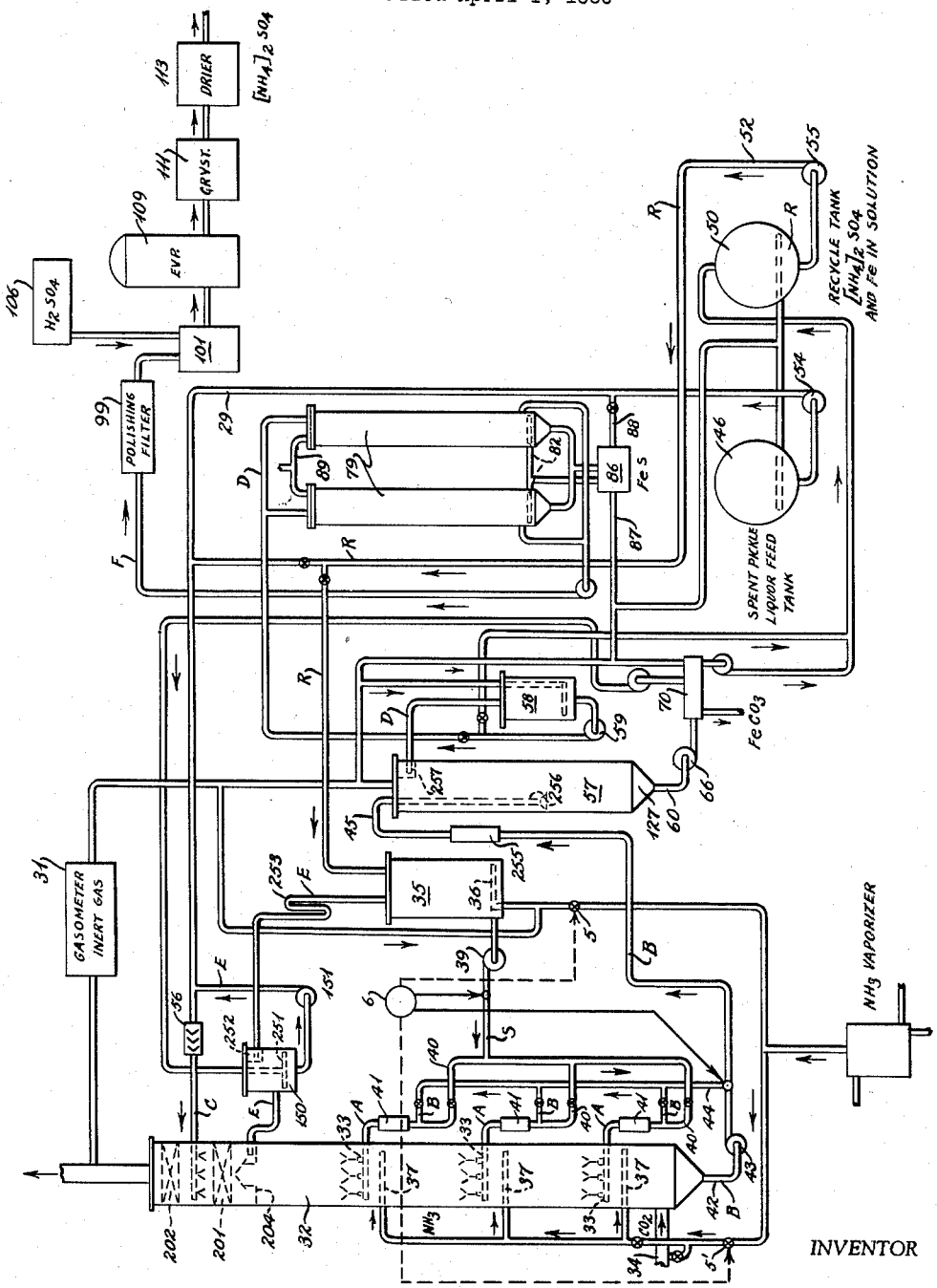
INVENTOR
Franklin D. Cooper
BY Beale & Jones
ATTORNEYS

United States Patent Office 2,939,763
Patented June 7, 1960

2,939,763

TREATMENT OF WASTE PICKLE LIQUOR

Franklin D. Cooper, Morristown, N.J., assignor to Otto Construction Company, New York, N.Y.

Filed Apr. 1, 1955, Ser. No. 498,627

9 Claims. (Cl. 23—61)

This invention relates to the production of iron-free ammonium sulfate and iron carbonate through the utilization of gases essentially comprising carbon dioxide and ammonia for the treatment of spent or waste pickle liquor.

In the processing of steel, or iron-bearing titanium ores, the disposal of waste pickle liquor presents an extremely serious problem. Waste pickle liquor is derived from sulfuric acid solutions employed in the cleaning of steel and in the extraction of iron-bearing titanium ores. Ordinarily, the waste pickle liquor will contain from about 2% to about 8% free sulfuric acid, together with about 10% to about 22% of ferrous sulfate. At the present time a large gallonage of waste pickle liquor is subjected to an expensive liming treatment to neutralize it before it can be disposed of in a stream, river, or lake. In the course of this lime neutralization, the slurry produced by the liming is generally held in large lagoons for the slow leaching of liquids from the precipitated solids. Prolonged contact with air and moisture in the lagoons results in the formation of mixtures of partly soluble iron sulfates, which either retard the leaching or result in discoloring water downstream from the lagoon basins. In order to meet the expense of this type of operation, efforts have been directed toward the production of a cheap building material from the solids precipitated by the liming. To date, the results of these efforts have not been quite as successful as had been anticipated.

Other pickle liquor disposal processes have been developed which have special requirements by way of heat, pressure, compressed air, costly filtering devices and the use of hot waste slag. There are also numerous prior processes which rely upon the use of coke oven gas in treating pickle liquors. Such gases contain hydrogen sulfide, cyanogen compounds, and usually, only about 2% carbon dioxide. In such processes various cyanide compounds of iron are produced which make filtration of the treated pickle liquor very difficult. Furthermore, iron sulfides form, in preference to iron carbonates, with the result that iron compounds of little or no commercial value are produced by such processes.

In general, processes suggested in the prior art for the production of ammonium sulfate from waste pickle liquor have invariably suffered from the difficulty that, in actual operation, the product ammonium sulfate contained iron. The presence of iron causes discoloration and lowers the quality and salability of such ammonium sulfate. Furthermore, the iron compounds derived from these prior art processes have so little value they are substantially waste products and their handling and other costs are not justified.

Accordingly, an object of the present invention is to overcome these disadvantages of the prior art by providing a high quality, substantially pure, iron-free ammonium sulfate through the treatment of waste pickle liquor with a gaseous mixture containing ammonia and a gas essentially comprising carbon dioxide.

Another object of this invention is to provide a process for the utilization of waste gases essentially comprising carbon dioxide, and waste pickle liquor, wherein, through the use of ammonia, with such waste gases, valuable iron products and a high quality iron-free ammonium sulfate may be produced.

Another object of this invention is to provide a simple, inexpensive method for disposing of waste pickle liquor which does not require abnormal amounts of heat and pressure, expensive equipment and control devices, or costly reagents and which, in operation, does not involve complex filtration or other handling problems nor the loss of any reagent employed; such as, for example, ammonia.

A further object of this invention is the provision of a method for the recovery of iron-free ammonium sulfate and iron carbonate of good quality by converting waste pickle liquor into an alkaline liquor by means of novel recycling and neutralizing techniques, and contacting the alkaline liquor with ammonia and a sulfide-free, cyanide-free gas essentially comprising carbon dioxide so that the ammonia and carbon dioxide are rapidly absorbed in the liquor to form ammonium and carbonate ions which react rapidly with the ferrous and sulfate ions present in the alkaline liquor.

A still further object of this invention is to provide for the treatment of an alkaline liquor containing ferrous ions, sulfate ions and free ammonia, which liquor is derived from waste pickle liquor, with a sulfide-free, cyanide-free gas containing above 3%; and, preferably, above 5% carbon dioxide; less than 2% sulfur dioxide, and less than 4% oxygen, to produce iron-free ammonium sulfate, insoluble iron carbonate and a minor amount of iron hydrate which facilitates the separation of the iron carbonate.

It is also an object of this invention to treat an alkaline liquor derived from waste pickle liquor and containing ferrous ions, sulfate ions and free ammonia with ammonia and a gas essentially comprising carbon dioxide to produce insoluble iron carbonate and an alkaline solution of ammonium sulfate which solution may be sulfided while alkaline to remove all traces of ferrous ions thus permitting the recovery of iron-free ammonium sulfate.

These and other objects of the invention may be accomplished by a process in which a gaseous mixture comprising essentially carbon dioxide and ammonia is passed in counter-current contact with a modified waste pickle liquor through at least two distinct zones or chambers. In the first of these zones or chambers, which is identified as the alkaline section, the gas stream encounters and reacts with an alkaline feed liquor comprising partially treated waste pickle liquor containing ammonium sulfate and soluble iron salts in the form of ferrous ions, sulfate ions and free ammonia. In this zone, the ammonia and carbon dioxide go into solution as ammonium carbonate and ammonium bicarbonate, which react with the soluble ferrous sulfate and other soluble iron compounds to form a precipitate of iron carbonate. Traces of iron hydrate are formed either by virtue of the presence of up to 4% oxygen in the contacting gas or by the decomposition of traces of ferric carbonate which may form. The iron carbonate is sparingly soluble, and is readily removable by a number of conventional methods.

The gas stream is then passed into a second zone or chamber which is a predominantly acidic zone where all of the remaining ammonia is scrubbed from the gas with a mixture of spent pickle liquor and recycled partially neutralized pickle liquor to form ammonium sulfate which remains in solution. The gaseous effluent from the acidic zone preferably contains from 3 to 5% by volume carbon dioxide, is largely inert, and may be employed for a number of purposes in this process where inert gases are desired. The iron carbonate, with traces of iron hydrates, at the most less than 2% by weight of iron hydrates, is desirably separated from the liquid effluent from the first gas contact zone. After removal of these insoluble materials, the liquor may be subjected to further refining treatments, in order to remove any remaining traces of iron. A portion of the liquid effluent from the first or alkaline chamber is recycled with a feed stock liquor to form an alkaline feed liquor for the initial contact area, where the recycled effluent contributes to the volume of the liquid, adjusts the pH of the alkaline feed liquor to between 5.5 and 9.5, and enhances the liquid-gas contact in that portion of the process. The feed stock liquor is obtained, as will presently be described in greater detail, by the neutralization of the free acid equivalent in spent pickle liquor with ammonia.

Desirably, there is a complete separation between the two zones of liquid-gas contact. The liquid effluent from the ammonia scrubbing acidic zone is removed from that zone; and, preferably, a portion thereof is recycled to the ammonia scrubbing acidic zone, while the balance is treated with ammonia, mixed with a recycled liquor containing ammonium sulfate and iron compounds, and injected directly into the initial contact zone for the gaseous mixture.

While it is usually desirable to recycle a portion of the effluent from the primary or alkaline gas treatment zone back to that zone, a substantial portion of this liquid effluent may be subjected to separation by decantation or other conventional separation. The slurry obtained from the decantation may be subjected to further separation operations, such as filtration, whereby solid iron carbonate of excellent quality may be separated from the liquor. The liquid effluent from the decantation is subjected to further refining to remove the last traces of soluble iron from the solution which is now a relatively high quality ammonium sulfate solution. The last vestiges of soluble iron are removed by treating the liquor while it is alkaline with hydrogen sulfide, whereby iron sulfide is precipitated. This precipitate may be substantially removed by decantation and a polishing filter, after which the solution of ammonium sulfate may be adjusted to the desired pH by the addition of sulfuric acid. The solution is then subjected to evaporation to produce a concentrated solution of ammonium sulfate from which the ammonium sulfate may be crystallized, dried, and stored.

It has been found desirable in the operation described above to recycle a portion of the liquor at various points during the process. Thus, a substantial portion of the liquor from the ammonia scrubbing or acidic section of the counter-current gas-liquid contact zone may be recycled to the input of that zone. Similarly, a portion of the liquor from the carbonation or primary zone may be recycled to the liquid input to that zone. After the liquid effluent from the primary, alkaline, or carbonation zone has been decanted and filtered, a portion of the filtrate may be accumulated in a tank for recycling either to the ammonia scrubbing or acidic contact zone, or to the primary or alkaline zone, or to both.

The iron carbonates recovered in this process may be calcined under varying conditions to produce pigments or abrasives or may be used directly in the wet purification of gas from hydrogen sulfide and the like. After air oxidation of the iron carbonates, the resulting material may be used for the dry purification of gas from hydrogen sulfide and the like, after mixing with shavings or other suitable diluents or binders; these mixtures may also be employed in the fluidized purification of gas from hydrogen sulfide and the like. Thus, the iron carbonate may be effectively used in spray scrubbers without grids such as are disclosed in the patents of the Otto Construction Corporation for the removal of hydrogen sulfide from gaseous mixtures. Alternatively, the iron carbonates may be sintered, with the simultaneous recovery of carbon dioxide and the production of an iron product which may be employed as a substitute for iron ore in the production of iron.

The iron sulfide produced during the final purification of the ammonium sulfate liquor with hydrogen sulfide may be employed as a part of the cyclic process discussed herein for the further production of hydrogen sulfide. Alternatively, the iron sulfide may be sintered on a sintering belt for the recovery of the iron therein, while simultaneously producing sulfur dioxide. The iron sulfide may also be employed in the treatment of radioactive liquid wastes.

The carbon dioxide-bearing gas employed in this process may be obtained from a limestone kiln, a bicarbonate calciner, or from a blast furnace. The gas may also be obtained from the burning of any conventional type liquid, gaseous or solid carbonaceous fuel. The gas must contain at least 3% by volume carbon dioxide, from about 5% to about 50% by volume being quite satisfactory, and with from 8% to 25% by volume being preferred. The gas employed in this invention must, however, be substantially cyanide-free and sulfide-free to be operative, hence unpurified coke oven gas cannot be employed. It is possible to produce a satisfactory carbon dioxide-bearing gas through the use of a special burner which burns short to produce one or two percent carbon monoxide, which may be converted catalytically to carbon dioxide with commercially available catalysts for this purpose, such as iron ore and iron oxide, giving a substantially oxygen-free atmosphere. It is permissible to employ a gas in this process containing up to 4% by volume oxygen, but it is preferred to maintain the oxygen content thereof at less than 1.0% by volume, since the formation of small amounts of iron hydrate, in excess of 2% by weight hinders the separation of the iron carbonate. The gas employed should not contain in excess of 2.0% by volume sulfur dioxide since the latter, in larger amounts, produces ammonium sulfites and bisulfites in amounts sufficient to cause a build-up of metal sulfites and may be reduced to form colloidal sulfur that deposits in filters, thus rendering them inoperative. The sulfur dioxide content of the gas may be controlled by using a fuel containing less than about 3.5% sulfur. It is also possible to employ blast furnace gases, or the products of combustion from the burning of blast furnace gases. Thus, many products of combustion may be used, including those products of combustion from burning gaseous, liquid or solid carbonaceous fuels. This invention also may be carried out with artificially prepared mixtures of carbon dioxide, ammonia, and inert gases.

A more comprehensive understanding of this invention may be obtained by reference to the accompanying drawing.

Referring to the drawing, spent pickle liquor for use as feed in this process is accumulated in a suitable feed tank 46. Pickle liquor of the type suitable for use in the present process ordinarily contains from about 2% to about 15% by weight of free sulfuric acid, and from about 6% to about 25% by weight of ferrous sulfate. However, these concentrations are not critical and suitable pickle liquor for use in the present process may contain more or less of either or both of these components. Thus, for example, the spent pickle liquor feed may be derived from an ammonium bisulfate pickling process. Ordinarily, such a spent liquor contains no free sulfuric acid as such, but does contain a free sulfuric acid equivalent, in the form of unreacted ammonium bisulfate in low concentration. Such a spent pickle liquor is quite suitable for use in the present process, which is particularly designed for the treatment of acidic solutions containing ferrous ions and sulfate ions.

From the feed tank 46 the pickle liquor is delivered by a pump 54 through a conduit 29 and a mixing nozzle 56 into a countercurrent gas-liquid contact column 32. In the mixing nozzle 56, the spent pickle liquor is intermixed with recycled, partially neutralized spent pickle liquor containing ammonium sulfate, ferrous ions, and sulfate ions, to form an acidic feed liquor for the gas-liquid contact column 32.

From the mixing nozzle, the liquid input (C) is sprayed into the top of the countercurrent contact column 32 which is hereinafter designated as the reactor-carbonator. The reactor-carbonator 32 may be any suitable type of contact tower for effecting intimate contact between the feed liquor and the gas stream. For example, the reactor-carbonator 32 may be a substantially empty metal shell, equipped at the top with a spray distributor 201 for the feed liquor, and an entrainment arrestor bed 202. Ceramic, metallic, or any other type of spiral or other packing may be employed for improving the gas-liquid contact in the column and for construction of the entrainment arrestor bed 202.

The upper portion of the reactor-carbonator 32 is an acidic section whose primary function is to scrub any remaining traces of ammonia from the gas which is about to leave the column. The lower portion of the reactor-carbonator in an alkaline section in which the formation of ammonium sulfate and iron carbonate is accomplished. A demarcation between the upper or acidic section and the lower or alkaline section of the reactor-carbonator is provided by a hooded cap tray 204. On this tray, the acidic effluent liquor (E) from the acid section of the reactor-carbonator is removed and is transferred into a pump tank 150.

Since it is highly desirable to avoid contact between the liquor and air, in order to avoid oxidation of the iron compounds, the liquor is preferably blanketed in the pump tank with an inert gas, and, as well, wherever possible throughout the system. Inert gas for the entire system may be provided by pumping any portion of the discharged gas from the reactor-carbonator 32 into a gasometer 31, where it may be stored under pressure.

The inert gas for the pump tank is desirably obtained from a source occurring later in the system. After the iron carbonate slurry has been obtained by decantation, this slurry is filtered to obtain an iron carbonate filter cake and an ammonium sulfate liquor. The filtration is preferably accomplished under a blanket of inert gas from the gasometer 31, and is expedited by the use of a vacuum, in order to achieve a high filtration rate. The off-gases from the vacuum pump contain inert gas from the gas blanket, and ammonia which has escaped from the liquor because of the reduced pressure. These off-gases are desirably employed to provide the inert gas blanket in the pump tank 150, where the ammonia is absorbed as the gas bubbles up from the sparger 251 through the acidic liquor.

A portion of the contacted liquor (E) from the pump tank 150 is delivered through the recirculation pump 151 back to the mixing nozzle 56, thus providing a recirculation which increases the volume of the acidic solution in the acidic section of the reactor-carbonator. This increased volume enhances the gas-liquid contact. The pump tank 150 is also provided with an overflow weir 252 which discharges by gravity through a seal pipe 253 into an interneutralization tank 35. Uunder normal operating conditions, the liquid overflow leaving the pump tank 150 through the seal pipe 253 is always equal to the volume of liquor which passes through the mixing nozzle 56, exclusive of the recycled amount from the pump tank 150.

The interneutralization tank 35 receives the contacted acidic liquid effluent (E) from the pump tank 150, and also a large amount of recycle liquor (R) containing ammonium sulfate and soluble iron from a recycle tank 50, which is delivered by means of a pump 55 through a suitable conduit 52. These two liquids are mixed in the interneutralization tank 35 by a stream of inert gas which is admitted through the sparger 36 at the bottom of the tank. Controlled amounts of ammonia may be mixed with the inert gas by means of an automatic valve 5 and the mixture of ammonia and inert gas is then introduced into the tank 35 to reduce the acidity of the liquor. These are several purposes for the addition of ammonia at this point. An important purpose is to control the pH of the liquor so that it is within a range where the formation of insoluble iron compounds is minimized, thus facilitating spraying into the alkaline (lower) section of the reactor-carbonator 32. At a pH of 5.5 or lower, no ferrous hydrate will form, but the maintenance of a pH lower than about 5.5 precludes the addition of any substantial amount of ammonia in the interneutralization tank 35. Another important purpose of ammonia addition in the interneutralizing tank is to provide a liquor of the proper pH in the reactor-carbonator for absorption of carbon dioxide. At atmospheric pressure, carbon dioxide is not readily absorbed in acidic solutions. When the pH of the liquor is adjusted to about 5.5 to 6.0, in the interneutralization tank, the combined action of admixture with alkaline recycle liquor and injection into an atmosphere rich in ammonia and carbon dioxide, promptly produces ammonium carbonate and bicarbonate in solution. This leads to the desired formation of iron carbonate by reaction with the soluble iron in the solution. In the range of 5.5 to 6.0, the formation of solids in the interneutralization tank is minimal, and spraying the liquor into the alkaline section of the reactor-carbonator is a simple operation.

For best operation, it is desirable to distribute the ammonia addition to the process between the gases entering the alkaline section of the reactor-carbonator and the liquor in the interneutralization tank. Regulation of the pH of the liquor in the interneutralization tank to about 5.9 usually results in a highly satisfactory distribution. At this pH, the formation of hydrates is inconsequential, but a considerable amount of ammonia can be absorbed. The automatic valve 5 through which ammonia is introduced into the inert gas is controlled by a pH responsive control 6 having electrodes in the discharge line 40 from the tank. The inert gas in the mixture thereof with ammonia excludes air from the interneutralization tank, improves gas-liquid contact and provides thorough mixing in the tank 35.

From the interneutralization tank 35 the ammoniated liquor, hereinafter designated as the feed stock liquor (S), is delivered by a pump 39 into the alkaline section of the reactor-carbonator through conduits 40 leading to a group of spray distributors 33 which are arranged in parallel. Before entering the reactor-carbonator 32, the feed stock liquor combines with recycled liquid effluent (B) from the alkaline section of the reactor-carbonator, to form an alkaline feed liquor (A). The alkaline feed liquor (A) desirably has a pH in the range of about 7 to about 8, although it may be in the range of 5.5 to 9.5 while starting up, or during exceptional operating periods. Desirably, the conduits 40 are provided with heat exchangers 41 for controlling the temperature of the alkaline feed liquor (A) as it enters the alkaline section of the reactor-carbonator.

In the alkaline section of the reactor-carbonator the alkaline feed liquor (A) comes into intimate contact with gas containing both carbon dioxide and ammonia. It is probable that, in the alkaline section, the ammonia and carbon dioxide react in aqueous solution to form a solution of ammonium carbonate and ammonium bicarbonate, which, in the presence of ferrous sulfate and additional free ammonia, form ferrous carbonate, traces of ferric carbonate and ammonium sulfate. These iron compounds are only sparingly soluble and precipitate out of the solution. The contacted liquor (B) leaving the reactor-carbonator 32 through the bottom header 42 is, therefore, a solution of ammonium sulfate containing a suspension of insoluble ferrous carbonate, suspended traces of ferric carbonate and other insolubles, and slight amounts of soluble iron compounds. A portion of this may be recycled to the reactor-carbonator by passing it through the pump 43 and the recycle conduit 44 to the heat exchangers 41. The recycled contacted liquor (B) increases the volume of liquid in the alkaline section and thus enhances the gas-liquid contact in the reactor-carbonator. The recycle should be between 50% and 90% by volume of the total amount of contacted liquor (B) leaving the reactor-carbonator. The balance of the liquid input to the alkaline section is obtained from the interneutralization tank 35. The presence of a large proportion of high pH, recycled contacted liquor (B) in the alkaline feed liquor raises the pH of this liquor into the range 7 to 8, under good operating conditions. The recycling of precipitated carbonate, in suspension, also promotes the formation of relatively large particles of precipitate, which facilitates later separation of the precipitate.

In order to produce the insoluble iron carbonates in the liquid effluent (B) from the alkaline section, the gas employed must be rich in carbon dioxide and the proper pH must be maintained in the solution by the use of ammonia. Better operating conditions are obtained if the ammonia additions are properly proportioned between the interneutralization tank 35 and the reactor-carbonator 32. Thus, the ammonia addition in the interneutralizing tank 35 is desirably controlled automatically so that the pH in the feed stock liquor (S) is about 5.9. Ammonia may be added to the reactor-carbonator in a gaseous admixture with the carbon dioxide and inert carrier or inert diluent gases, if any, through the inlet gas header 34; or, alternatively, the ammonia may be injected through a series of injection pipes 37, arranged beneath the alkaline feed liquor sprays 33. In either case, the addition of the ammonia is desirably controlled by a valve 5' controlled automatically by a pH responsive control 6. The carbon dioxide content of the inlet gas (total amount to the reactor-carbonator 32) should desirably be about 3% to about 50% by volume. A sufficient concentration of carbon dioxide should be employed so that there is a detectable amount of carbon dioxide present in the discharge gases from the reactor-carbonator. While carbon dioxide contents as low as 3% by volume of the input gas may be employed, 8% or more by volume of carbon dioxide is desirable. Gases of this carbon dioxide content are readily available from a plurality of sources. For example, any of the common industrial fuels will normally yield a stack gas containing at least 8% carbon dioxide by volume. Where the input gas contains small amounts of carbon monoxide, this may be catalytically converted into carbon dioxide by a plurality of catalytic reactions in common use for that purpose. This step has the added advantage of providing the reactor-carbonator with an oxygen-free atmosphere. In any case, it is desirable to employ a gas having as little oxygen as practicable. The presence of oxygen would lead to the undesirable oxidation of iron compounds to give large amounts of insoluble iron hydrates. Since these are not as readily separable from the liquid as are the carbonates, their formation should be minimized.

It is essential for successful operation that the gas be substantially free of sulfur dioxide. The presence of quantities of sulfur dioxide in the input gas is harmful and undesirable for several reasons. Sulfur dioxide, in amounts over about 2% by volume, produces ammonium sulfites, bisulfites, or thiosulfates in undesirably large quantities. This results in contamination of the iron carbonate, which renders it less desirable commercially and unsuited for many uses. These sulfur compounds are often reduced during the process, with the resultant undesirable formation of colloidal sulfur which contaminates the iron carbonate, and which deposits in the screens and filters and renders them inoperative. However, a sulfur dioxide content in the input gas of about 2% by volume, such as would be obtained by burning strip coal, is tolerable. The absence of cyanides in the input gas is also essential, since the complex cyanides which form during the process render filtration a practical impossibility.

The balance of the liquid effluent from the alkaline section of the reactor-carbonator is delivered by the pump 43 previously mentioned through a pipeline 45 into a large decanter tank 57. The pipeline 45 between the delivery pump 43 and the decanter tank 57 is desirably provided with a heat exchanger 255, for standardizing settling temperatures. The effluent transferred into the decanter is a slurry, and it is admitted to the decanter 57 through a conduit 45 which discharges near the midpoint of the total working depth of the decanter against a horizontal deflector plate 256. Insoluble solids in the input slurry settle toward the conical bottom 127 of the decanter, and the solids are withdrawn through a discharge conduit 60. The solids settling at the decanter bottom 127 are in the form of a thick slurry which is transferred by a pump 66 into a filter 70. Alternatively, a thickener (not shown) may be interposed between the filter 70 and the pump 66 to decrease the load on the filter. The filtrate and any washings produced in the operation of the filter are returned to the recycle tank 50, for reprocessing.

The iron carbonate filter cake from the filter 70 is removed for further processing such as drying and sintering. Alternatively, the filter cake may be processed in a slurry feed preparation tank, prior to use in the purification of various gases. The filter cloth may be freed periodically of slimy insoluble iron precipitates by washing with acidic spent pickle liquor. This prevents "cloth blinding." These washings are desirably returned directly to the pickle liquor storage tank 46 for processing through the reactor-carbonator (flow not indicated in the diagram), or, alternatively, the washings may be added to the filtrate stream going to the recycle tank 50. The cake itself may be washed with water, and the washings are desirably transferred into the recycle tank 50 for processing in the interneutralization tank 35.

The liquid effluent from the decanter 57 is taken off over a weir 257 at the top of the decanter, from which it flows into an accumulator or surge tank 58. The rate of flow of clarified liquor (D) from the decanter is equivalent to the input of spent pickle liquor feed processed, plus washings from the filter cake, plus recycled clarified liquor which had been returned to the reactor-carbonator for reprocessing from the accumulator tank 58, by way of the recycle tank 50, and through either the acidic section of the reactor-carbonator or the interneutralization tank 35. Regulation of the flow into the sulfiding tanks is accomplished by a piping arrangement in which a pump 59 may transfer up to a certain rate of flow to the sulfiding tanks with any excess being transferred into the recycle tank 50. The accumulator tank 58 serves to smooth out flow in the system, since any sudden surges of liquid into the accumulator tank are routed into the recycle tank 50.

The ammonium sulfate solution (D) which has been transferred into the sulfiding tank 79 contains small amounts of soluble iron. In order to remove these amounts of soluble iron, gaseous hydrogen sulfide is introduced into the tank through a sparger 82. Iron sulfide is formed and is allowed to settle to the bottom of the treatment tank for removal. In order that the operation may be continuous, a plurality of treatment tanks may be employed in parallel relationship.

While the source of the hydrogen sulfide may be an independant generator, or a gas bottle, it is advantageous to collect the settled iron sulfide in a generator 86 for regeneration. Hydrogen sulfide may be produced in this generator by treating the iron sulfide with fresh pickle liquor pumped through a line 88 from the spent pickle liquor feed tank 46 by the feed pump 54. Alternatively, other acidic materials may be employed for the regeneration.

In order to avoid the formation of iron hydrates in the sulfiding tank 79, a stream of inert gas is desirably introduced into the tank continuously through a line 87 into the sulfide generator 86 and the sparger 82. The agitation derived from the inert gas has a beneficial effect in the flocculation of the iron sulfide, and assists in forming precipitated particles of a desirable size. The continuous stream of inert gas also dilutes the hydrogen sulfide, thereby affording a more intimate contact between the solution and the sulfide gas. The formation of hydrates at this point is particularly to be avoided, since hydrate formation would make the settling and filtration of the solution very difficult and slow, would cause the waste of hydrogen sulfide gas, and would render unavailable the regeneration system just described. The inert gases may be vented continuously through vents 89 at the top of each sulfiding tank. When any of the tanks are empty, between batches, the flow of inert gas should be continued in order to avoid the entrance of air. When a tank is emptied, the flow of inert gas should be sufficient to prevent the entrance of air into the tank.

After settling has taken place in the treatment tank 79, the supernatant liquor is pumped through a polishing filter 99 which removes all traces of solid material from the liquor. The liquid which has passed through the polishing filter 99 is clear, free of insoluble materials, and is free of grease. This liquor is collected in final neutralization tanks 101, in which the liquor is treated with a controlled amount of iron-free sulfuric acid from a storage tank 106 in order to convert any free ammonia to ammonium sulfate. The treatment with the iron-free sulfuric acid may be continuous and is regulated so that a pH in the range of 6.0 to 9.0 is obtained. The liquor is then subjected to evaporation in a conventional multiple-effect evaporator 109, which supplies concentrated ammonium sulfate liquor to the crystallizer 111. The wet crystals and magma from the crystallizer 111 are centrifuged, and the crystals are dried and stored. These product crystals are substantially free of any contaminating iron, grease, or other undesirable substances.

The preceding description of the process, as illustrated in the flow sheet, will make clear the underlying principles of the present invention. It will be understood that many modifications may be made in the process which are within the scope of the invention. A few such modifications will appear in the processes described in detail in Table I. Thus, for example, in the relatively small scale operations described in Table I, where the volume of spent pickle liquor treated per hour was less than 150 gallons per hour in each case, the volume of pickle liquor treated by the process was increased by the amount of water employed to wash the filter cake. The washings from the filter cake, including about 95% of the ammonium sulfate retained on the cake as well as the wash water, were collected in the recycle tank 50; and, from the recycle tank, were transferred into the interneutralization tank 35, thence into the alkaline section of the reactor-carbonator. As can be seen from Table I, the amount of water employed to wash the filter cake may be a relatively small amount, or it may be sufficient to add substantially to the total amount of pickle liquor treated in the process.

The following data were obtained from a relatively small scale operation and will serve to illustrate the operation of the invention.

TABLE I

REACTOR-CARBONATOR GAS BALANCE

| Example | 1 | 2 | 3 | 4 | 5 | 6 |
|---|---|---|---|---|---|---|
| 1. S.c.f.h. $CO_2$-Bearing Gases Entering Reactor-Carbonator at 60° F. 30″ Hg sat. with water ($NH_3$-Free Basis) | 4,000 | 4,000 | 4,000 | 3,000 | 3,000 | 3,000 |
| 2. Vol. Percent $CO_2$ in Gases Entering Reactor-Carbonator ($NH_3$-Free Basis) | 10.00 | 10.00 | 10.00 | 21.00 | 21.00 | 21.00 |
| 3. Lbs. $NH_3$ per hour in Gases Entering Alkaline Section of Reactor-Carbonator | 18.80 | 18.82 | 18.80 | 38.73 | 38.83 | 38.54 |
| 4. Gases Entering Reactor-Carbonator: | | | | | | |
| Total c.f.h. | 4,420 | 4,420 | 4,420 | 3,866 | 3,866 | 3,866 |
| $NH_3$—c.f.h. | 420 | 420 | 420 | 866 | 866 | 866 |
| $CO_2$—c.f.h. | 400 | 400 | 400 | 630 | 630 | 630 |
| 5. Gases Leaving Alkaline Section of Reactor-Carbonator: | | | | | | |
| Total c.f.h. | 3,816 | 3,816 | 3,816 | 2,598 | 2,598 | 2,598 |
| $NH_3$—c.f.h. | 16 | 16 | 16 | 18 | 18 | 18 |
| $CO_2$—c.f.h. | 200 | 200 | 200 | 210 | 210 | 210 |
| 6. Lbs. $NH_3$ per hour in Gases Leaving Alkaline Section of Reactor-Carbonator | 0.72 | 0.72 | 0.72 | 0.81 | 0.81 | 0.81 |
| 7. Total c.f.h. Gases Leaving Acid Section of Reactor-Carbonator | 3,800 | 3,800 | 3,800 | 2,580 | 2,580 | 2,580 |
| 8. Vol. Percent $CO_2$ in Gases Leaving Reactor-Carbonator ($NH_3$-Free Basis) | 5.26 | 5.26 | 5.26 | 8.14 | 8.14 | 8.14 |

REACTOR-CARBONATOR LIQUID BALANCE

| | 1 | 2 | 3 | 4 | 5 | 6 |
|---|---|---|---|---|---|---|
| 9. G.p.h.[1] Spent Pickle Liquor Feed To Acidic Section of Reactor-Carbonator | 66.0 | 33.3 | 43.8 | 138.6 | 70.0 | 91.9 |
| 10. Analysis of Pickle Liquor: | | | | | | |
| (a) (G.p.l.[2] $FeSO_4$) | 146 | 288 | 220 | 146 | 288 | 220 |
| (b) (G.p.l. $H_2SO_4$) | 51 | 21 | 108 | 51 | 21 | 108 |
| 11. G.p.h. Water from 3 Displacement Washings of $FeCO_3$ Solids | 22.1 | 22.1 | 22.1 | 46.4 | 46.4 | 46.4 |
| 12. G.p.h. Filtrate Washings Recycled to the Interneutralization Tank | 122.6 | 133.2 | 175.2 | 257.4 | 280.0 | 367.6 |
| 13. G.p.h. Feed to Alkaline Section of Reactor-Carbonator (Exclusive of recycled effluent from the alkaline section) | 188.6 | 166.5 | 219.0 | 396.0 | 350.0 | 459.5 |
| 14. Feed to Alkaline Section of Reactor-Carbonator: | | | | | | |
| (a) Vol. Percent Neutralized Pickle Liquor | 35 | 20 | 20 | 35 | 20 | 20 |
| (b) Vol. Percent Recycled Separated Liquor | 65 | 80 | 80 | 65 | 80 | 80 |
| (c) G.p.l. $FeSO_4$ Equiv. | 57.6 | 65.6 | 52.0 | 57.6 | 65.6 | 52.0 |
| 15. Lbs. $H_2SO_4$ Entering System Per Hour | 27.83 | 5.83 | 39.42 | 58.90 | 12.25 | 82.71 |
| 16. Lbs. $H_2SO_4$ Per Hour Reacting with $NH_3$ in Gas Leaving Alkaline Section of Reactor-Carbonator | 2.07 | 2.07 | 2.07 | 2.33 | 2.33 | 2.33 |
| 17. Lbs. $H_2SO_4$ Per Hour Reacted by $NH_3$ in Recycled Liquor and by direct $NH_3$ addition in interneutralization tank | 25.76 | 3.76 | 37.35 | 56.57 | 9.92 | 80.38 |
| 18. G.p.h. Reactor-Carbonator Effluent (B) to Decanter (Excludes amount recycled back into the alkaline section) | 196.0 | 178.1 | 228.5 | 411.4 | 373.8 | 470.4 |
| 19. G.p.h. Potential Filtrate in Reactor-Carbonator Effluent Liquor (B) | 171.0 | 149.5 | 203.4 | 358.7 | 318.5 | 424.7 |
| 20. Composition of Effluent Liquor (B) from the Reactor-Carbonator: | | | | | | |
| (a) G.p.l. $FeSO_4$ Equiv | 10.0 | 10.0 | 10.0 | 10.0 | 10.0 | 10.0 |
| (b) G.p.l. Free $NH_3$ | 2.0 | 2.0 | 2.0 | 2.0 | 2.0 | 2.0 |
| 21. Vol. Percent Potential Filtrate in R-C Effluent Liquor (B) | 87.2 | 85.1 | 89.0 | 87.2 | 85.1 | 89.0 |

See footnote at end of table.

TABLE I.—Continued

FILTER CAKE

| Example | 1 | 2 | 3 | 4 | 5 | 6 |
|---|---|---|---|---|---|---|
| 22. Lbs. Per Hour Wet Washed FeCO$_3$ Produced | 126.5 | 125.8 | 126.0 | 265.7 | 264.1 | 264.3 |
| 23. Wet Washed FeCO$_3$ Cake Composition: | | | | | | |
| (a) Percent A.S.T.M. H$_2$O | 48.5 | 48.5 | 48.5 | 48.5 | 48.5 | 48.5 |
| (b) Percent FeCO$_3$ Equiv | 48.5 | 48.5 | 48.5 | 48.5 | 48.5 | 48.5 |
| (c) Percent (NH$_4$)$_2$SO$_4$ | 3.0 | 3.0 | 3.0 | 3.0 | 3.0 | 3.0 |

SULFIDING OPERATION

| Example | 1 | 2 | 3 | 4 | 5 | 6 |
|---|---|---|---|---|---|---|
| 24. G.p.h. Filtrate to Sulfider | 70.5 | 38.4 | 53.3 | 147.7 | 84.9 | 103.5 |
| 25. Grams FeSO$_4$ Equivalent Sulfided Per Hour | 2,668 | 1,435 | 2,020 | 5,598 | 3,216 | 3,922 |
| 26. C.f.h. H$_2$S Req'd for Sulfiding FeSO$_4$ only | 14.7 | 7.9 | 11.2 | 30.9 | 17.6 | 21.7 |
| 27. G.p.h. Original Pickle Liquor Req'd to Produce H$_2$S for FeSO$_4$ Equiv. Removal | 8.96 | 11.40 | 3.20 | 18.70 | 26.10 | 6.19 |

AMMONIUM SULFATE RECOVERY

| Example | 1 | 2 | 3 | 4 | 5 | 6 |
|---|---|---|---|---|---|---|
| 28. G.p.h. Iron-Free Liquor to the Neutralizer 101, ahead of the Evaporator 109 | 70.5 | 38.4 | 53.3 | 147.7 | 84.9 | 103.5 |
| 29. G.p.l. Free NH$_3$ in Liquor to Neutralizer | 1.50 | 1.50 | 1.50 | 1.50 | 1.50 | 1.50 |
| 30. Grams Per Hour Free NH$_3$ to Neutralizer | 401 | 218 | 303 | 840 | 482 | 598 |
| 31. Lbs. Per Hour 66° Bé. H$_2$SO$_4$ for Neutralization | 2.73 | 1.48 | 2.06 | 5.50 | 3.28 | 4.07 |
| 32. G.p.h. 66° Bé. H$_2$SO$_4$ for Neutralization | 0.180 | 0.097 | 1.35 | 0.360 | 0.215 | 0.266 |
| 33. G.p.l. (NH$_4$)$_2$SO$_4$ in Neutral Evaporator Feed | 185 | 226 | 275 | 185 | 226 | 276 |
| 34. NH$_3$ Recovery as Salable (NH$_4$)$_2$SO$_4$ | 96.6 | 95.3 | 97.1 | 96.5 | 95.1 | 96.9 |

¹ G.p.h. refers to gallons per hour.
² G.p.l. refers to grams per liter.

Example 1

Referring to Example 1, that operation of the process was one in which the ammonia addition was distributed between the interneutralization tank and the stack gas which was employed as gaseous feed for the reactor-carbonator. The volume of carbon dioxide gas employed per hour, 4,000 standard cubic feet, is on an ammonia-free basis. On this same basis, the volume percentage of carbon dioxide in the stack gas was 10.00%. This was within the optimum operating range of 8 to 25 volume percent of carbon dioxide. This percentage represented the average of a number of readings taken continuously during the operation. The same is true of other figures in Table I. Starting up and shutting down periods were excluded in computing the average in order to obtain typical operating data.

In Example 1, all of the ammonia added to the reactor-carbonator was gaseous ammonia and was added to the carbon dioxide-bearing gas immediately preceding the injection of that gas into the reactor-carbonator. 18.80 pounds of ammonia per hour was the rate of feed of ammonia into the reactor-carbonator, and the greater percentage of this ammonia was absorbed or reacted in the alkaline section of the reactor-carbonator. Only 0.72 pound of ammonia per hour left the alkaline section of the reactor-carbonator and entered the acidic section.

Following the flow of liquid through the system, the net throughput of the acidic section of the reactor-carbonator was equal to the feed rate of spent pickle liquor, 66.0 gallons per hour (line 9) in Example 1. This scrubbed any remaining ammonia from the gas passing out of the reactor-carbonator. The liquid effluent of the acidic section flowed by gravity into the interneutralization tank, where it was mixed with a recycled liquid (R) from the recycle tank 50, composed of a mixture of clear filtrate from the filtration of the iron carbonate slurry, washings from the displacement water washes off the filter cake, clear filtrate from the decanter tank, and a relatively very small amount of pickle liquor from the generation of hydrogen sulfide. In each of these examples, all of the recycled liquid from the recycle tank 50 was transferred into the interneutralization tank 35, in preference to recycling with the spent pickle liquor feed going into the acid section of the reactor-carbonator. The rate of flow of the recycled liquor (R) into the interneutralization tank was 122.1 gallons per hour (line 12). This increased the net throughput of the alkaline section of the reactor-carbonator to 188.6 gallons per hour. Since 65% by volume of the total throughput of the alkaline section comprised recycled effluent from the alkaline section (line 14b) whereas the "net" throughput of 122.1 gallons per hour constituted only 35% by volume of the total (line 14a), the total throughput for the alkaline section was comparatively large. Because of the absorption of ammonia and carbon dioxide in the alkaline section, with the subsequent formation of ammonium sulfate and iron carbonate, the amount of effluent from the alkaline section is larger than the amount of input liquor. In Example 1, the input to the alkaline section was 188.6 gallons per hour, whereas the output was 196.0 gallons per hour (line 18), an increase of 7.4 gallons per hour directly attributable to reactions taking place in the alkaline section.

The 196.0 gallons per hour of alkaline section effluent contained a sufficient amount of liquid, excluding the precipitated carbonate, to provide, theoretically, 171.0 gallons per hour of clear filtrate in the decanter (line 19). Actually, however, theoretically perfect decantation is not obtained, and some of the ammonium sulfate solution is entrained in the iron carbonate filter cake. The supernatant liquor from the decanter was divided into two portions, 70.5 gallons per hour going to the sulfiding tanks (line 24), and the balance being transferred into the recycle tank 50, and from there to the interneutralization tank 35. The heavy iron carbonate slurry obtained in the bottom of the decanter was filtered to obtain a clear filtrate and a filter cake. The clear filtrate was transferred, in its entirety, into the recycle tank 50, for reprocessing in the interneutralization tank. The filter cake was washed with three displacement washes of water, and the washings thus obtained were also transferred into the recycle tank for eventual reprocessing in the interneutralization tank. The filter cake was produced at the rate of 126.5 pounds of wet cake per hour (line 22). Approximately 95% of the ammonium sulfate entrained in the cake was removed by the water washing and was recovered from the washings. The wet cake contained about 61.4 pounds of water per hour, or 48.5% by weight of the wet cake (line 23a). The recycle tank 50 therefore received liquor from the filtering operation, the washing operation, and from the decanting. Together with the spent pickle liquor employed from time to time in the hydrogen sulfide generator, this recycle liquor was returned to the interneutralization tank for the recovery of ammonium sulfate contained therein, and for the purpose of increasing the total throughput of the alkaline section, for the many purposes already mentioned.

The sulfiding operation removes all remaining traces of soluble iron in the solution of ammonium sulfate with substantially no change in the volume of the solution. The output from the sulfiding tanks is therefore approximately equal to the input to the sulfiding tanks. An amount of iron equivalent to 2,668 grams of ferrous sulfate was removed each hour in the sulfiding tanks.

The spent pickle liquor employed as feed in each of the examples reported in Table I was obtained from a sulfuric acid pickling bath. On the average, in Example 1, the spent pickle liquor feed in the feed storage tank 46 contained 51 grains per liter of sulfuric acid, and 146 grams per liter of ferrous sulphate or its equivalent (line 10b). The spent pickle liquor was introduced into the process through the acidic section of the reactor-carbonator, then passed into the interneutralization tank 35. The total input of sulfuric acid to the process per hour in Example 1 was 27.83 pounds (line 15). In the acid section of the reactor-carbonator, 2.07 pounds of sulfuric acid per hour were consumed in scrubbing ammonia from the discharge gases (line 16). In the interneutralization tank, the remaining 25.76 pounds of sulfuric acid (line 17) were essentially neutralized by the addition of sufficient ammonia in that tank to adjust the pH of the effluent feed stock liquor to approximately 5.9. Complete neutralization was achieved in the reactor-carbonator, where sufficient ammonia was injected to raise the pH of the effluent liquor (B) to a pH of 9 to 9.5. The effluent liquor from the alkaline section contained only about 10.0 grams per liter of ferrous sulfate equivalent (line 20a), as contrasted with the 146 grams per liter in the spent pickle liquor feed to the process (line 10). The effluent from the alkaline section also contained approximately 2.0 grams per liter of free ammonia. The excess of free ammonia in the liquor maintained the pH in the desirable range of 9 to 9.5 throughout the rest of the system, that is, during the decanting of the ferrous carbonate, and during the sulfiding operation.

The iron sulfide produced in the sulfiding tanks was used to produce hydrogen sulfide for treatment of succeeding batches. If this could have been done on a continuous basis, it would have required about 8.96 gallons of spent pickle liquor per hour to decompose the iron sulphide. Nearly quantitative recovery of hydrogen sulfide was obtained by the decomposition.

Since there is substantially no change of volume in the sulfiding tanks, the same output was obtained from the tanks as was put into the tanks; namely, 70.5 gallons per hour. This output was substantially iron-free, and was treated with iron-free sulfuric acid to bring the pH of the solution within the range of about 6 to 9. The solution was then concentrated by evaporation, and crystallized to obtain iron-free ammonium sulphate. The recovery of ammonia as salable ammonium sulfate was equivalent to 96.6% by weight of the ammonia input.

This operation produced 126.5 pounds of ferrous carbonate filter cake per hour. The cake contained less than 3% by weight of ammonium sulfate, and more than 97% wet ferrous carbonate cake. This cake was approximately equally divided by weight between entrained water and the ferrous carbonate solids.

*Example 2*

In Example 2, the rate of feed to the acid section of the reactor-carbonator was decreased to 33.3 gallons per hour. However, the pickle liquor feed was much richer in its content of ferrous sulfate than that of Example 1, having 288 grams per liter of ferrous sulfate equivalent. The amount of water used for the filter cake was 22.1 gallons per hour, and this was passed through the reactor-carbonator by way of the interneutralization tank 35. Since the spent pickle liquor contained only approximately 21 grams per liter of free sulfuric acid, the total amount of sulfuric acid entering the system per hour was only 5.83 pounds. In order to compensate in part for the smaller total throughput of spent pickle liquor, the recycle ratio in the acid section of the reactor-carbonator was increased. In the alkaline section, 80% by volume of the effluent from the alkaline section was recycled thereto as a part of the alkaline feed liquor.

Although the total input to the reactor-carbonator was considerably less than in Example 1, because of the higher concentration of ferrous sulfate equivalent in the feed liquor, the amount of ferrous carbonate cake produced per hour was approximately the same, being 125.8 pounds per hour. It was of substantially the same quality as that produced in Example 1. The overall ammonia recovery as salable ammonium sulfate was 95.3, which is comparably high with the recovery obtained in Example 1.

*Example 3*

In Example 3, the input to the acid section of the reactor-carbonator of spent pickle liquor was 43.8 gallons per hour. This batch of spent pickle liquor contained 220 grams per liter of ferrous sulfate equivalent, and 108 grams per liter of free sulfuric acid. The recycle ratio in the alkaline section was maintained at 80% by volume of the total input to the alkaline section. Because of the very high concentration of free sulfuric acid in the spent pickle liquor feed, the total amount of sulfuric acid entering the system per hour was 39.42 pounds. In this third example, the ammonia recovery was 97.1% efficient, as salable ammonium sulfate. The higher recovery is probably attributable, in part at least, to the high concentration of free sulfuric acid in the spent pickle liquor feed.

*Example 4*

In Example 4, the spent pickle liquor feed had the same analysis as that used in Example 1. The input to the acid section was increased to 138.6 gallons per hour of spent pickle liquor. There was also added to the system, from the recycle tank 50, 46.4 gallons per hour of wash water from the filter cake washing, together with displaced ammonium sulfate solution. The high input volume of spent pickle liquor produced 265.7 pounds of wet ferrous carbonate cake per hour. The ammonia recovery was 96.5% efficient as salable ammonium sulfate. Because of the high input rate, the recycle ratio in the alkaline section of the reactor-carbonator was dropped to 65% by volume of the total input to the alkaline section.

*Example 5*

In Example 5, the spent pickle liquor employed had the same analysis as that used in Example 2. The input to the reactor-carbonator of spent pickle liquor was regulated to 70 gallons per hour. 46.4 gallons per hour of wash water used to wash the ferrous carbonate filter cake, together with displaced liquor, were added to the system. This produced 264.1 pounds per hour of wet ferrous carbonate filter cake, and resulted in a 95.1% recovery of the ammonia as salable ammonium sulfate.

*Example 6*

In Example 6, the spent pickle liquor feed had the same analysis as that employed in Example 3. The flow rate was set to 91.9 gallons of spent pickle liquor per hour to the acid section of the reactor-carbonator. This was augmented by the addition of 46.4 gallons per hour of wash water used to wash the filter cake, together with displaced ammonium sulfate solution, which were added to the interneutralization tank. In both Examples 5 and 6, because of the relatively low throughput, the recycle ratio in the alkaline section was set at 80% by volume of the total feed to the alkaline section. In Example 6, this produced a wet ferrous carbonate cake amounting to 264.3 pounds per hour, and resulted in an ammonia recovery of 96.9% as salable ammonium sulfate.

While the process which has been described is extremely flexible, the process depends for its success on the occurrence of certain chemical reactions, and care must be taken to employ suitable reagents and to adjust the reaction conditions throughout the process in order that the desired reactions take place. Thus, the process is designed to recover valuable components from acidic waste liquors, and is equally efficient for the recovery of ammonium sulfate from spent pickle liquors derived from sulfuric acid pickling solutions and from ammonium bisulfate pickling solutions. While a typical pickle liquor from a sulfuric acid pickling process will contain free sulfuric acid together with ferrous sulfate, inhibitors, and other materials, the spent pickle liquor from a bisulfate pickling solution will contain a small amount of ammonium bisulfate, ferrous sulfate, ferric sulfate, manganese sulfate, and copper sulfate. The amount of ammonium bisulfate present in the spent liquor measures the free acid activity of the spent pickle liquor. In extreme cases, it may be desirable to add a small amount of free acid to the spent pickle liquor to facilitate operations. The process is fundamentally the same with either type of feed liquor, despite the minor differences in actual composition.

Pickling operations are notoriously erratic and seasonal, and the present process is specifically designed to accommodate fluctuations in the amount and type of available raw material. Where only a small amount of spent pickle liquor solution is available, and it is necessary to decrease the feed rate into the reactor-carbonator to a low amount, the total amount of liquid passing through the reactor-carbonator may be maintained at a normal level by increasing the amount of recycle. Additional volume of liquid is provided by employing water for washing the filter cake of iron carbonate. The wash water and displaced solution may be added directly to the interneutralization tank for treatment with ammonia, with subsequent injection into the alkaline section of the reactor-carbonator. For example, in a typical installation of this process at a pickling plant, the typical normal feed rate of spent pickle liquor to the acid section of the reactor-carbonator might be on the order of 500 gallons per hour. An additional 200 gallons of water could be employed to wash the filter cake, and the washings would be added to the alkaline section of the reactor-carbonator after treatment with ammonia in the interneutralization tank.

As has previously been pointed out, the gas stream fed into the reactor-carbonator may be obtained from a plurality of sources. An oxygen-free atmosphere is conductive to the formation of ferrous carbonate of easily filterable characteristics, free from the slime which is characteristic of iron hydrate, and which is filterable only with great difficulty. The burning of fuel to provide a gas for the reactor-carbonator affords operational economies since the heat produced in the burner may be employed to operate the heat exchangers in the process where necessary, and to operate the evaporator and dryer in the final processing of the ammonium sulfate solution.

Whatever the source of gas for the reactor-carbonator, it is desirable that the carbon dioxide be provided in a considerable excess over that necessary in the process. The excess of carbon dioxide tends to drive the reaction in the desired direction, and is a desirable component of the inert gas employed to blanket solutions throughout the process.

The acid section of the reactor-carbonator functions as a scrubber since it removes any traces of ammonia from the gas, thereby providing an extremely economical operation. The liquid effluent from the acid section of the reactor-carbonator is acidic in nature, and in order to remove iron from this solution, as a carbonate, it must be rendered alkaline. There are several possible ways in which to render the solution alkaline. It can be accomplished by injecting all the necessary ammonia along with the carbon dioxide bearing gases entering the reactor-carbonator. Alternatively, all of the ammonia could be injected at a plurality of levels within the reactor-carbonator. Each of these alternatives imposes great demands on the reactor-carbonator, making its design and operation difficult. As another alternative, all the ammonia could be added to the liquor immediately preceding injection of the liquor into the reactor-carbonator. Similarly, any combination of the preceding alternatives could be employed. Each of the preceding alternatives represents a possible method for operating the process, but each represents an extreme. For example, the injection of all of the ammonia into the liquor immediately preceding delivery of the liquor into the reactor-carbonator would raise the pH of the liquor, and would create a region of high ammonia concentration in the reactor-carbonator at the point or points of liquid delivery to the reactor-carbonator. In this region, ferrous hydrate would tend to form because of the high pH before the carbonate ion in solution became sufficiently concentrated to cause the formation of any substantial amount of ferrous carbonate. The result is invariably, under the operating conditions, the occlusion of ferrous hydrate within a ferrous carbonate precipitate. Where all of the ammonia is introduced in the reactor-carbonator, there is an admixture of a very alkaline recycle liquor with a highly acidic spent pickle liquor, immediately prior to the delivery of the feed liquor to the reactor-carbonator. Although the mixture of liquors, if thoroughly mixed and reacted, is alkaline, under operating conditions localized acidic "pockets" form, with the consequent undesirable dissolution of ferrous carbonate from the recycled liquor. Furthermore, if a feed liquor of low pH is delivered to the alkaline section of the reactor-carbonator, the design must provide sufficient time of passage in the tower for sufficient ammonia absorption by the liquor to raise the pH to an effective level for the formation of ammonium carbonate and ferrous carbonate.

The preferred method of ammonia addition is one in which the addition is distributed between injection into the interneutralization tank and gaseous injection into the reactor-carbonator, preferably along with the carbon dioxide bearing gases. In the interneutralization tank, sufficient ammonia is added, in the preferred method of operating the present process, to bring the pH of the solution into the range of about 5.5 to 6.0. The use of an interneutralization tank for this purpose standardizes the conditions in the reactor-carbonator to a desirable extent, simplifies the design of the reactor-carbonator, and facilitates control over operating variables. Some ferrous hydrate is precipitated in the interneutralization tank when the pH of the solution rises higher than 6.0. Therefore, it is highly desirable that the pH of the solution in the interneutralization tank be maintained at as low a level as is consistent with a good balance of ammonia addition between the interneutralization tank and the injection of the reactor-carbonator. A pH of about 5.9 has been found to be the optimum. The effluent from the interneutralization tank which has been referred to, for convenience, as a feed stock liquor, is united with a fairly large amount of recycled effluent from the alkaline section of the reactor-carbonator, and is injected immediately into the alkaline section. Although the pH of the combined streams of feed stock liquor and recycled effluent from the alkaline section is such that this solution has a pH in the neighborhood of 7 to 8, the time of contact between the two solutions before injection in the reactor-carbonator is extremely brief, and this alkaline feed liquor immediately makes contact with carbon dioxide, so that a carbonate precipitate forms. During the typical operations, the alkaline feed liquor will contain up to 2.0 grams per liter of free ammonia equivalent, and anywhere between 15 and 200 grams per liter of ferrous sulfate equivalent. The alkaline feed liquor also contains substantial amounts of ferrous carbonate, ferrous sulfate, ammonium sulfate, ferrous ammonium sulfate, and ammonium hydroxide. The recycle ratio of effluent from the alkaline section may vary from about 10% by volume of the effluent up to about 95% by volume. A range of 50% to 90% is generally preferable.

In order to increase the throughput of alkaline feed liquor in the alkaline section of the reactor-carbonator, it is possible to increase the recycle ratio to the upper limit of about 95% by volume, as just mentioned. It is also possible to recycle into the interneutralization tank some of the decanted, clarified liquor obtained from the decanter 57. The decanted liquor has been clarified by the removal of the ferrous carbonate precipitate, and the recycling of a portion of this liquor increases the volume of liquid passing through the alkaline section, thus decreasing the concentration of iron carbonate precipitate without diluting the ammonium sulfate solution. Where the concentration of iron carbonate in the alkaline feed liquor is such that spraying becomes difficult, recycling a portion of the decanted liquor has many advantages. One such advantage is the thinning of the effluent slurry. Pumping is considerably facilitated where this slurry is thinned by the presence of a recycled portion of the decanted liquor.

The production of a fast settling, easily filtered iron carbonate precipitate in the alkaline section of the reactor-carbonator requires careful control over reaction conditions, such as the contact time in the reactor-carbonator, the solution and gas temperatures, the recycle ratios, and the gas composition. The pressure in the reactor-carbonator is also an important control variable. While the preceding examples and general description have related to operations conducted at atmospheric pressure, a more effective formation of ammonium carbonate in the alkaline section is obtained when the pressure in the tower is superatmospheric. As will be pointed out, the formation of ammonium carbonate is believed to be the first of a series of reactions which take place in the reactor-carbonator. A pressure of between 3 and 5 atmospheres is sufficient to enhance this reaction rate without unduly increasing the cost of the equipment.

Where a proper balance of ammonia addition between the interneutralization tank and the reactor-carbonator is obtained, it is found that the volume percent of carbon dioxide should closely parallel to the volume percent of ammonia in the input gas. Thus, where the input gas contains about 10% by volume carbon dioxide, an amount of ammonia equivalent to about 9% by volume of ammonia generally suffices for a typical spent pickle liquor feed derived from a sulfuric acid pickling solution. Similarly, where the input gases consist essentially of about 21% by volume of carbon dioxide, the amount of ammonia which should be employed is in the neighborhood of an equivalent of about 20% by volume of ammonia.

The ammonia and carbon dioxide go into solution extremely rapidly, and react to form ammonium carbonate. At or about 58° C., ammonium carbonate decomposes into ammonia and carbon dioxide. Ammonium bicarbonate decomposes slowly at 38° C., and completely at 60° C., breaking up into the carbonate, carbon dioxide and water. Careful temperature control in the reactor-carbonator is therefore important. Heat exchangers are desirably provided to maintain the liquid temperatures below 60° C. Higher temperatures cause undesirable decomposition. The carbonate ion in solution reacts with the ferrous ion in solution to form insoluble ferrous carbonate, which precipitates immediately and drives the reaction to completion. The presence of a slight excess of ammonium hydroxide favors the formation of ferrous carbonate and tends to minimize the formation of ferrous bicarbonate. However, an unduly high concentration of ammonium hydroxide promotes the formation of iron hydrate, which is undesirable. Close control over the amount of free ammonia everywhere in the system is therefore important. A consideration of these and other factors indicate that low operating temperatures, increased masses of reactants, and increased pressure, all favor the desired reaction in the alkaline section of the reactor-carbonator.

The temperature may be controlled principally by the use of heat exchangers for the alkaline feed liquor. The temperature of the input gas may also be controlled. The concentration of ammonia at any point in the reactor-carbonator may be controlled, to some extent, by a proper location of injectors for the ammonia within the reactor-carbonator. For example, an ammonia injector may be positioned directly under each alkaline feed liquor spray inlet in the reactor-carbonator. In the simplest form of operation, equivalent amounts of ammonia are injected in each of these locations. However, highly desirable results are obtained where larger amounts are injected in the lowermost locations. This increases the time of contact between the ammonia, the carbon dioxide, and the alkaline feed liquor.

Control over the pH of the alkaline feed liquor is also a significant factor in obtaining an iron carbonate precipitate of desirable physical characteristics. The simplest effective control may be obtained through the recycling of liquid effluent from the reactor-carbonator, as has been pointed out previously. This provides a practical control over the pH, without the undesirable formation of hydrate slimes which would be obtained if that same pH were obtained through the addition of ammonia in the interneutralization tank.

Where the system is operated, as is desirable, so that the gases discharged from the reactor-carbonator contain between 3 and 5 volume per cent of carbon dioxide, some advantages may be obtained by recycling a portion of these discharge gases through the reactor-carbonator. Such a recycling dilutes the gas feed to the reactor-carbonator and tends to prevent the formation of ammonium bicarbonate in the alkaline section. The increased volume also provides for a greater degree of turbulence in the reactor-carbonator, and thus provides a more intimate contact between the liquids and gases in countercurrent flow.

In the decanter, the iron carbonate settles out as a gelatinous, amorphous, semi-colloidal mass having a large surface. This mass has the unique characteristic of absorbing and scavenging inhibitors from the liquor. These inhibitors are those which are customarily added to the pickling solutions, and which are carried over into the spent pickle liquor. Unless removed in some way, the inhibitors ordinarily contaminate ammonium sulfate recovered from spent lickle liquor. Ordinarily, these inhibitors are heterocyclic nitrogen compounds, and their presence in ammonium sulfate is undesirable. Trace elements are also scavenged by the semi-colloidal ferrous carbonate precipitate in the decanter. For example, manganese and copper carbonates are relatively insoluble, in the presence of a small excess of free ammonia, and are removed in the decanter by the scavenging action of the ferrous carbonate.

The iron carbonate filter cake obtained by filtration of the slurry from the decanter is a very valuable product. The filter cake may be calcined to produce pigments or abrasives. It may also be used as a wet cake directly in the wet purification of gases. The wet filter cake is extremely effective in removing hydrogen sulfide from gases. The filter cake may also be oxidized in air to produce a material which is efficacious for the removal for the removal of hydrogen sulfide in the dry purification of gas. Alternatively, the air-oxiized filter cake may be mixed with shavings, or other suitable diluents or binders, to produce products usable in the fluidized purification of gas. The filter cake may also be sintered, with the simultaneous recovery of carbon dioxide and an iron product useful in the production of metallic iron. Any carbon dioxide recovered from the filter cake may be used directly in the reactor-carbonator. The value of the iron carbonate filter cake is severely diminished where the filter cake is contaminated by the presence of iron sulfide, as will be readily appreciated.

The decanter is merely a means for separating a thick slurry of ferrous carbonate from soluble-iron contaminated ammonium sulfate solution. Consequently, an equivalent piece of apparatus, such as a centrifuge, thickener, or clarifier could be used in place of the decanting tank. However, settling in a tank offers simplicity of operation and ease of maintenance. Further concentration or thickening of the slurry from the decantation tank may be obtained through the use of a hydro-cyclone, which would provide a thickened slurry for the filter.

In order to provide uniformity of settling rates throughout the change of seasons, it is desirable that the feed line to the decanter be provided with a heat exchanger. Through proper use of the heat exchanger, it is possible to maintain a uniform temperature all year around, thus standardizing operating conditions. The pH of the liquor in the decanter should be maintained in the range of about 9 to 9.5, for best separation of the iron carbonate precipitate. This, of course, is controlled through the regulation of the amount of ammonia which is employed to treat the spent pickle liquor in the reactor-carbonator.

The clarified liquor from the decanter contains a small amount of soluble iron. This soluble iron is removed in the sulfiding tanks. The small amount of hydrogen sulfide which is employed in the sulfiding operation is insufficient to change the pH of the solution to any significant degree from its input pH of 7 to 9.5.

Although many types of apparatus could be employed for carrying out the sulfiding operation, it is preferred to use settling tanks. The iron sulfide remaining at the bottom of the settling tank after decantation of the supernatant liquor frequently has a tendency to adhere to the walls of the tank. This undesirable tendency may be avoided by agitation of the sulfide through the injection of inert gas to a sparger at the bottom of the tank. The agitated material forms a slurry which is easily removed.

The clarified liquor produced by the process is a valuable source of iron-free ammonium sulfate. One final chemical reaction takes place to insure maximum recovery of ammonia: the pH is adjusted by iron-free sulfuric acid. This produces a solution ideally suited for recovery of salable ammonium sulfate solids.

It will be understood that the above description and examples have been given by way of illustration only, and are not intended to limit the scope of the invention in any way.

I claim:

1. A process for producing iron carbonate and ammonium sulfate from spent pickle liquor which comprises introducing into a reactor-carbonator zone an alkaline feed liquor (A) having a pH of about 7.0 to 8.0 and containing ferrous ions, sulfate ions and free ammonia, contacting said feed liquor (A) in said zone with gaseous ammonia and a gas consisting essentially of from about 5 to 50 percent by volume carbon dioxide, said gas being cyanide-free and sulfide-free and containing less than about 4 percent by volume oxygen and less than 2 percent by volume sulfur dioxide to produce a liquor (B) containing dissolved ammonium sulfate and an insoluble iron carbonate precipitate, the volume percent of gaseous ammonia being about equal the volume percent of said carbon dioxide, adding ammonia to an acidic liquor (E) containing ammonia and spent pickle liquor to produce a feed stock liquor (S) having a pH in the range of 5.5 to 6.0, mixing a portion of said liquor (B) with said feed stock liquor (S) to produce said feed liquor (A) immediately prior to introducing said feed liquor (A) into said reactor-carbonator zone, separating and recovering the insoluble iron carbonate precipitate from the balance of said liquor (B), and thereafter recovering iron-free ammonium sulfate from the liquor remaining after said separation.

2. The process of claim 1 wherein said gas consisting essentially of carbon dioxide contains from about 8 to 25 percent by volume carbon dioxide and the volume percent of gaseous ammonia is about equal the volume percent of carbon dioxide.

3. A process for producing iron carbonate and ammonium sulfate from spent pickle liquor which comprises introducing into a reactor-carbonator zone an alkaline feed liquor (A) having a pH of about 7.0 to 8.0, and containing ferrous ions, sulfate ions and free ammonia, contacting said feed liquor (A) in said zone with gaseous ammonia and a gas consisting essentially of from about 8 to 25 percent by volume carbon dioxide, said gas being cyanide-free and sulfide-free and containing less than about 4 percent by volume sulfur dioxide to produce a liquor (B) containing dissolved ammonium sulfate and an insoluble iron carbonate precipitate, the volume percent of gaseous ammonia being about equal the volume percent of said carbon dioxide, mixing a portion of said liquor (B) with a feed stock liquor (S) having a pH in the range of 5.5 to 6.0 to produce said feed liquor (A) immediately prior to introducing said feed liquor (A) into said reactor-carbonator zone, separating and recovering the insoluble iron carbonate precipitate from the balance of said liquor (B) to provide a separated liquor (D) containing dissolved ammonium sulfate, mixing a portion of said liquor (D) with an acidic liquor (E) containing ammonia and spent pickle liquor and adding ammonia to said mixture of liquors (D) and (E) to produce said feed stock liquor (S) having a pH in the range of 5.5 to 6.0, and recovering iron-free ammonium sulfate from the remainder of said separated liquor (D).

4. The process of claim 3 wherein a portion of said separated liquor (D) and ammonia are mixed with said acidic liquor (E) containing ammonia and spent pickle liquor to produce said feed stock liquor (S) having a pH of about 5.9.

5. The process of claim 3 wherein said separated insoluble iron carbonate precipitate is washed with water and a portion of said separated liquor (D), ammonia and said wash water are mixed with said acidic liquor (E) containing ammonia and spent pickle liquor to produce said feed stock liquor (S) having a pH of about 5.9.

6. A process for producing iron carbonate and ammonium sulfate from spent pickle liquor which comprises introducing into a reactor-carbonator zone an alkaline feed liquor (A) having a pH of about 7.0 to 8.0 and containing ferrous ions, sulfate ions and free ammonia, contacting said feed liquor (A) in said zone with gaseous ammonia and a gas consisting essentially of from about 5 to 50 percent by volume carbon dioxide, said gas being cyanide-free and sulfide-free and containing less than about 4 percent by volume oxygen and less than 2 percent by volume sulfur dioxide to produce a liquor (B) containing dissolved ammonium sulfate and an insoluble iron carbonate precipitate, the volume percent of gaseous ammonia being about equal the volume percent of said carbon dioxide, discharging unreacted gaseous ammonia from said reactor-carbonator zone into an acidic absorption zone, introducing an acidic feed liquor (C) containing spent pickle liquor into said acid absorption zone to absorb said discharged unreacted gaseous ammonia, withdrawing an acidic liquor (E) containing spent pickle liquor and absorbed ammonia from said acidic absorption zone, adding additional ammonia to said acidic liquor (E) to produce a feed stock liquor (S) having a pH in the range of 5.5 to 6.0, mixing a portion of said liquor (B) with said feed stock liquor (S) to produce said feed liquor (A) having a pH of about 7.0 to 8.0 immediately prior to introducing said feed liquor (A) into said reactor-carbonator zone, separating and recovering the insoluble iron carbonate precipitate from the balance of said liquor (B), and thereafter recovering iron-free ammonium sulfate from the liquor remaining after said separation.

7. The process of claim 6 wherein a portion of the acidic liquor (E) containing spent pickle liquor and absorbed ammonia withdrawn from said acidic absorption zone is mixed with spent pickle liquor to produce said acidic feed liquor (C).

8. The process of claim 6 wherein said acidic liquor (E), said feed stock liquor (S) and said liquor (B) during the separation of the insoluble iron carbonate precipitate therefrom are maintained under a blanket of gaseous carbon dioxide to minimize the exposure of said liquors to oxygen.

9. The process of claim 6 wherein the liquor remaining after the separation of the insoluble iron carbonate precipitate from said balance of said liquor (B) but before the recovery of the ammonium sulfate is maintained under a blanket of gaseous carbon dioxide to minimize the exposure of said liquor to oxygen and gaseous hydrogen sulfide is introduced into said liquor to precipitate any traces of iron therein as iron sulfide, separating said iron sulfide from said liquor.

References Cited in the file of this patent
UNITED STATES PATENTS

| | | |
|---|---|---|
| 2,511,306 | Tiddy | June 13, 1950 |
| 2,511,307 | Tiddy | June 13, 1950 |
| 2,775,508 | Thomsen | Dec. 25, 1956 |